(12) United States Patent
Ata

(10) Patent No.: US 11,724,773 B2
(45) Date of Patent: Aug. 15, 2023

(54) BICYCLE

(71) Applicant: Sanetaka Ata, Yokohama (JP)

(72) Inventor: Sanetaka Ata, Yokohama (JP)

( * ) Notice: Subject to any disclaimer, the term of this patent is extended or adjusted under 35 U.S.C. 154(b) by 43 days.

(21) Appl. No.: 17/382,748

(22) Filed: Jul. 22, 2021

(65) Prior Publication Data

US 2022/0024539 A1     Jan. 27, 2022

(30) Foreign Application Priority Data

Jul. 26, 2020    (JP) .................................. 2020-126039

(51) Int. Cl.
    *B62M 11/04*         (2006.01)
    *B62K 23/00*         (2006.01)

(52) U.S. Cl.
    CPC ............. *B62M 11/04* (2013.01); *B62K 23/00* (2013.01)

(58) Field of Classification Search
    CPC . B62M 1/00; B62M 1/20; B62M 9/00; B62M 11/04; B62M 2009/005; B62K 23/00
    USPC ........................................................ 280/260
    See application file for complete search history.

(56) References Cited

U.S. PATENT DOCUMENTS

| | | | | |
|---|---|---|---|---|
| 567,042 A | * | 9/1896 | Raymond | ................ B62M 1/12 280/248 |
| 4,895,385 A | * | 1/1990 | Becoat | .................. B62M 11/00 280/260 |

* cited by examiner

*Primary Examiner* — Kevin Hurley
*Assistant Examiner* — Felicia L. Brittman
(74) *Attorney, Agent, or Firm* — Flynn Thiel, P.C.

(57) ABSTRACT

A bicycle having a frame with a saddle, and rear and front wheels. A large gear is rotated integrally with the rear wheel and is concentric with an axle thereof and includes a diameter smaller than the rear wheel. A small gear circumscribes the large gear above the rear wheel axle, a small gear supporting bracket swings about the rear wheel axle and rotatably supports the small gear. A load receiving surface, a load transmission unit movably supported to the frame and movable longitudinally on the load receiving surface are provided. A first sprocket is concentric with the small gear, a second sprocket is rotatably provided rear of the first sprocket and lower than the rotation center thereof, a chain is wound between the first and second sprockets, and a first rachet which mounted on the small gear restricts rearward rotation of the rear wheel via the large gear.

18 Claims, 4 Drawing Sheets

BICYCLE

TECHNICAL FIELD

The present invention relates to a bicycle. More specifically, the present invention relates to a bicycle which is capable of reducing the burden on the legs of a rider on a manually driven bicycle by using the weight of the rider, in a case where the bicycle climbs an uphill slope.

BACKGROUND ART

Conventionally, a bicycle which can be manually driven by a rider has been widely used. The conventional bicycle includes pedals, a saddle, a body frame on which the pedals are operatively mounted and on which the saddle is supported, and front and rear wheels. The front and rear wheels are provided at the front and the rear parts of the body frame, respectively, and the force on the pedals generated by the legs of the rider is transmitted to the rear wheel via a chain wound between a front sprocket connected to the pedals and a rear sprocket rotated integrally with the rear wheel, and thus the bicycle can be ridden.

In such a bicycle, in a case where the bicycle climbs an uphill slope, sufficient leg strength by the rider is required, so that the physical burden is heavy for aged people. On the other hand, in a case where the bicycle goes down a downhill slope, although such leg strength is not required, the speed of the bicycle is accelerated unless a manual brake is operated, which can cause a dangerous accident.

In this respect, a bicycle which can be driven by an electrical motor, an electrical hybrid bicycle which can be driven not only by the electrical motor but also by pedaling, or an electric assisted bicycle which can be driven by the electric motor driven by operation of the pedals, have been developed so far.

Thanks to these bicycles, the physical burden on the legs of the rider can be reduced in case of an uphill slope. However, a driving unit such as an electric motor and a battery for driving the driving unit are required, so that the cost of the bicycle is increased and the frequency of maintenance and inspection of the bicycle is high.

In addition, the effect of reducing the burden on the legs of the rider can be offset by an increase of the weight of the bicycle itself.

SUMMARY

Therefore, a manually driven bicycle is provided which is capable of reducing the burden on the legs of the rider by utilizing the rider's own weight, in a case where the bicycle climbs an uphill slope.

In view of the above technical problems, according to an aspect of the invention, there is provided a bicycle with a body frame which fixedly supports a saddle and rotatably supports rear and front wheels and a driving force is transmitted to said front wheel via pedaling of pedals with the rider's feet. A large gear which can be rotated integrally with said rear wheel is provided concentrically with a rear wheel axle, and includes a diameter smaller than that of said rear wheel, a small gear is provided so as to circumscribe said large gear at a level above the rear wheel axle, a small gear supporting bracket is provided so as to swing about said rear wheel axle and rotatably supports said small gear at its upper end and includes a load receiving surface at its lower end, a load transmission unit is provided which is downwardly movably supported on said body frame due to the downward load and adjustably movable in the longitudinal direction of the bicycle on said load receiving surface. A first sprocket is provided concentrically with said small gear so as to be rotatable integrally with said small gear, and a second sprocket is rotatably provided at a rear of said first sprocket and at a level lower than the rotation center of said first sprocket. A chain is wound between said first and second sprockets to transmit the rotation force between said first and second sprockets, and a first rachet is mounted on said small gear so as to restrict the rearward rotation of said rear wheel via said large gear, whereby the driving force can be transmitted to said rear wheel only by pedaling said pedal with said first rachet being disengaged from said small gear, while a physical burden on the rider's legs can be reduced by engaging said first rachet with said small gear to utilize the downward load, in accordance with the longitudinal position of said load transmission unit relative to said load receiving surface, in a case where the bicycle climbs an uphill slope.

In the bicycle with the above structure, based on the technical relationship between the large gear, with the diameter smaller than that of the rear wheel which is provided concentrically with the rear wheel about the rear wheel axle so as to be rotated integrally with the rear wheel, and the small gear which is provided so as to circumscribe the large gear at a level higher than the rear wheel axle, the rider's own weight is transmitted to the rear wheel via the saddle, the load transmission unit, the load receiving surface of the load transmission unit, the small gear support bracket, the small gear, and the large gear mating with the small gear.

Since the first sprocket which can rotate concentrically with the small gear, the second sprocket the center of the rotation of which is set lower than that of the first sprocket, and the chain which transmits the rotation force between the first and second sprockets, in a case where the bicycle is caused to climb an uphill slope, the physical burden on the legs of the rider can be reduced by the downward load being utilized with the small gear being engaged by the first rachet, in accordance with the longitudinally adjusted position of the load receiving surface of the load transmission unit.

According to an embodiment of the invention, said load transmission unit includes a L-shaped load transmission frame which is vertically swingably supported by said body frame, and a slide bracket which is interposed between said L-shaped load transmission frame and said small gear support bracket. The L-shaped load transmission frame includes a horizontal part and a vertical part, and a front end of said horizontal part is pivotably supported by a longitudinal upper frame portion of said body frame which said saddle is fixed to and extends in the longitudinal direction of the bicycle. The vertical part is vertically swingable and abuts against an upper end of said small gear support bracket, and said vertical part includes at its lower end portion a first groove which extends in the longitudinal direction of the bicycle. The small gear support bracket is L-shaped so as include a vertical bar and a longitudinal bar extending in the longitudinal direction from a lower end of the vertical bar, said small gear is rotatably supported at the upper end portion of said vertical bar, and a second groove extending in the longitudinal direction of the bicycle is provided on an upper surface of said longitudinal bar. The slide bracket includes a first roller which can roll in said first groove and a second roller which can roll in said second groove.

In an embodiment of the invention, a downwardly extending operation lever is provided near said saddle, and is rotatably supported at an intermediate portion by said body frame. An extension member, a front end of which is connected to the lower end portion of said operation lever, is provided, whereby the longitudinal position of said slide bracket can be adjusted by the movement in the longitudinal direction of the operation lever, with said first and second rollers being rolled in said first and second grooves, respectively.

In an embodiment of the invention, a pair of said first rollers which are spaced apart from each other in the longitudinal direction are provided, and said second roller is a single roller.

In an embodiment of the invention, a lock pin which is vertically movable is provided on said operation lever, a group of lock grooves, each of which extends in the direction perpendicular to the longitudinal direction of the bicycle, are provided on said body frame, whereby an inclination angle of said operation lever can be held, depending on which lock groove among said group of lock grooves said lock pin is locked against.

In an embodiment of the invention, said body frame includes a longitudinal lower frame portion. A front sprocket is connected to and rotatably supported on a front end of the longitudinal lower frames portion and is connected to a rear sprocket via said chain and rotatable by said pedal. The rear wheel, rotatable integrally with said rear sprocket, rotates about a rotation axis and is rotatably supported on a rear end of the longitudinal lower frame portion. A second sprocket support bar is provided so as to be swingable about said rotation axis of said rear wheel and rotatably supports said second sprocket at its upper end portion, and a first spring which biases said second sprocket support bar in the backward direction of the bicycle are further provided. A first rotation restriction member extending toward said second sprocket support bar is provided rearwardly of a position where said longitudinal lower frame portion supports said rear wheel.

In an embodiment of the invention, an upwardly extending second rotation restriction member is provided rear of a position where said longitudinal lower frame portion supports said rear wheel to restrict the rotation of said small gear support bracket in the backward direction of the bicycle.

In an embodiment of the invention, said operation lever is rotatably supported at a position frontwardly of where said longitudinal lower frame portion supports the rear wheel.

In an embodiment of the invention, a tension applying bracket, one end of which a roller is provided on and the other end of which a spring is mounted on, is rotatably provided on said second sprocket support bar.

In an embodiment of the invention, said small gear is provided at the highest level of said large gear.

In an embodiment of the invention, a second rachet, which restricts the rotation of said rear wheel in the backward direction of the bicycle, cooperates with said large gear, and is provided on a rear end of said longitudinal lower frame portion.

In an embodiment of the invention, a loading platform is provided on a rear portion of said bicycle in such a way that its weight is transmitted to said load transmission unit.

In an embodiment of the invention, a pair of said small gear support brackets and a pair of said L-shaped load transmission frames are provided in such a way that one of said small gear support brackets is mounted on one side of said bicycle along with one of said L-shaped load transmission frames, and the other of said small gear support brackets is mounted on an opposite side of said bicycle along with the other of said L-shaped load transmission frames.

In an embodiment of the invention, an angular range of the rotation of each of said small gear support bracket and said L-shaped load transmission frame is set to be between 1° and 2°.

In an embodiment of the invention, a vertically-extending slit is provided on a lower end portion of said operation lever in such a way that a front end of said extension member is vertically movable via the slit.

In an embodiment of the invention, a space between said first sprocket and said second sprocket and/or a level at which said first sprocket is provided are set in accordance with said downward load.

In an embodiment of the invention, a spring constant of said first spring is set, in accordance with a maximum expected inclination angle, in a case where the bicycle is caused to climb an uphill slope.

In an embodiment of the invention, the frontmost position of said slide bracket is set in accordance with a maximum expected inclination angle in a case where the bicycle is caused to climb an uphill slope.

DETAILED DESCRIPTION

Figure 1:
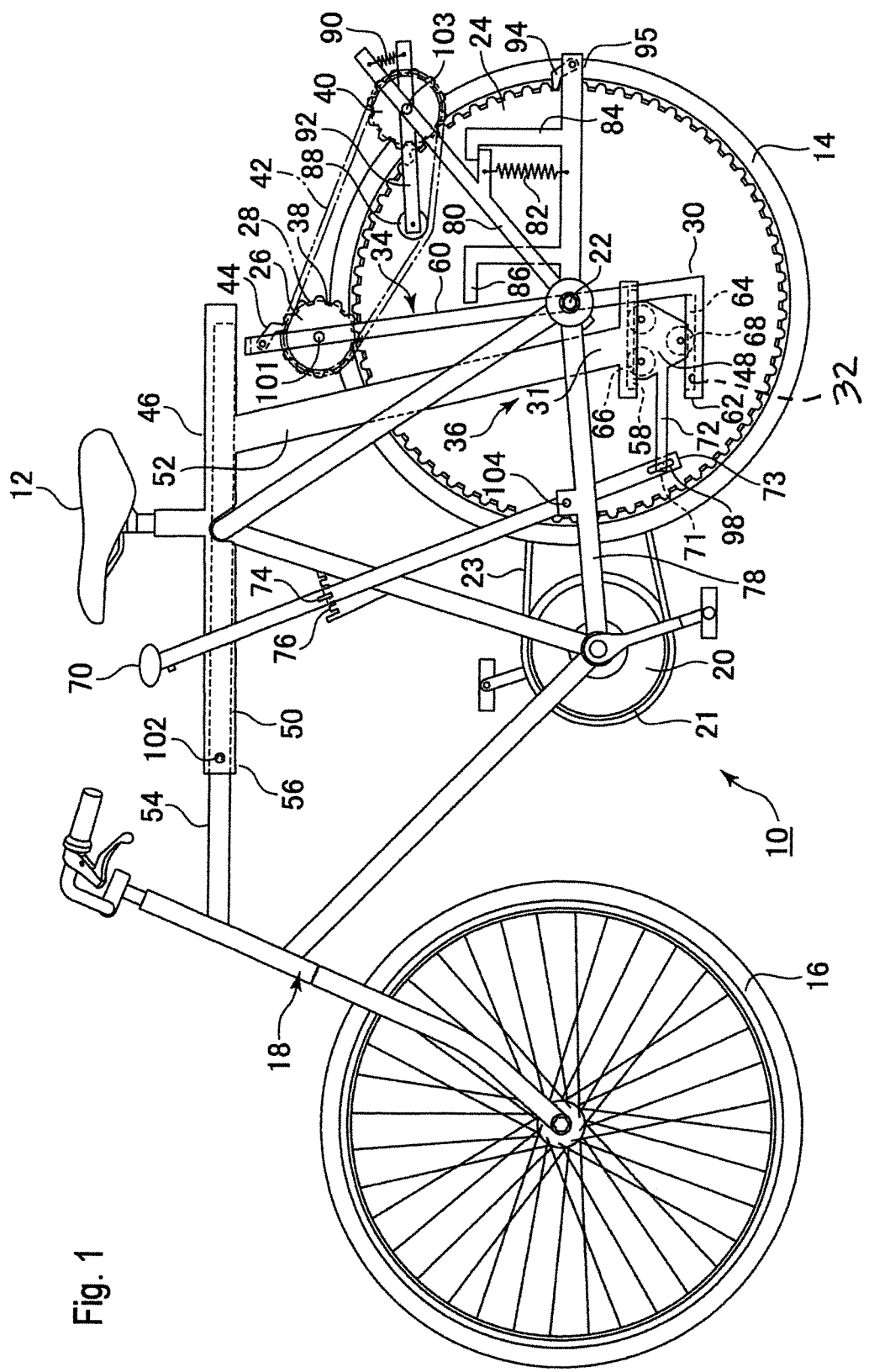
FIG. 1 is a left side view illustrating the bicycle according to the embodiment of the present invention.

An embodiment of the bicycle of the present invention will be described in detail, with reference to drawings.

As shown in FIGS. 1 to 4, the bicycle 10 includes a body frame 18, a front wheel 16 and a rear wheel 14.

More specifically, the bicycle 10 is of the type that the body frame 18, which the saddle 12 fixed on, rotatably supports the rear wheel 14 and the front wheel 16, so that a driving force is applied to the rear wheel 14 by pedaling pedals 20.

The body frame 18 includes a longitudinal lower frame portion 78 having a front end to which a front sprocket 21 is connected and is rotatably supported thereon. The front sprocket 21 is connected to a rear sprocket via the chain 23 and is rotatable by the pedals 20. A rear wheel axle 22 is connected to and rotatably supported on a rear end of the frame portion 78 and is rotatable integrally with the rear sprocket.

A large gear 24, a small gear 26, a small gear support bracket 34, a load transmission unit 36 and a sprocket mechanism will now be discussed.

These elements may be constructed of any material which is used for a conventional bicycle. A metal can be used, and a rigid plastic is preferred to make the bicycle light in weight.

The large gear 24 is provided concentrically with the rear wheel 14 about the rear wheel axle 22 so as to be rotated integrally with the rear wheel 14. The large gear 24 includes a diameter smaller than that of the rear wheel.

The small gear 26 is provided at a level higher than the rotation axis 22 of the large gear 24 so as to mate with the large gear in a circumscribing manner, and has a rotational axis 101. The small gear 26 is provided at the highest level of the large gear 24. As described below, the ratio of the teeth number of the large gear 24 to that of the small gear 26 may be appropriately set to reduce the physical burden on the user's legs when the bicycle is caused to climb an uphill slope.

The small gear support bracket 34 is provided so as to be swingable about the rear wheel axle 22 and to rotatably support the small gear 26 at its upper end portion 28 and to form a load receiving surface 32 at its lower end portion 30.

The small gear support bracket 34 is a L-shaped member including a vertical bar 60 and a longitudinal bar 62 which extends from the lower end of the vertical bar 60 toward the front side of the bicycle 10.

The small gear 26 is rotatably supported at the upper end portion 28 of the vertical bar 60, and a second groove 64, which extends in the longitudinal direction of the bicycle 10, is provided in the load receiving surface 32 of the longitudinal bar 62.

The load transmission unit 36 is supported for downward movement by a downward load (the weight of the rider, for example), and so as to be adjustably movable in the longitudinal direction of the bicycle 10 at the load receiving surface 32.

The load transmission unit 36 includes a L-shaped load transmission frame 46 which is supported so as to be vertically swingable on the body frame 18 and a slide bracket 48 which is interposed between the L-shaped load transmission frame 46 and the small gear support bracket 34. The L-shaped load transmission frame 46 includes a horizontal portion 50 and a vertical portion 52. A front end 56 of the horizontal portion 50 is pivotably supported at a frame pin 102 by the upper frame portion 54 of the body frame 18, which the saddle 12 is fixed to and extends in the longitudinal direction of the bicycle 10. The vertical portion 52 can be vertically swingable and includes at its lower end portion 31 a first groove 58 which extends in the longitudinal direction of the bicycle 10.

Each small gear support bracket 34 is paired with one of the L-shaped load transmission frames 46 and these components are connected to each other at upper portions. Thus, one of the small gear support brackets 34 is provided on one side of the bicycle 10 along with the corresponding L-shaped load transmission frame 46 and the other small gear support bracket 34 is provided on the other side of the bicycle 10 along with its corresponding L-shaped load transmission frame 46.

The slide bracket 48 includes a first roller arrangement 66 which can roll in the first groove 58 and a second roller 68 which can roll in the second groove 64.

The first roller arrangement 66 includes a pair of rollers which are separated from each other in the longitudinal direction of the bicycle 10 at the upper portion of the slide bracket 48, and the second roller 68 is a single roller located at the lower portion of the slide bracket 48. This allows the slide bracket 48 to be adjustably moved in the longitudinal direction of the bicycle 10.

A first sprocket 38 is provided concentrically with the small gear 26 so as to be rotated integrally with the small gear 28.

A second sprocket 40, the rotation center 103 of which is positioned at a level lower than that of the first sprocket 38, is provided to the rear of the first sprocket 38.

A chain 42 is wound between the first sprocket 38 and the second sprocket 40 in such a way that the rotation force can be transmitted therebetween.

Further, a second sprocket support bar 80 is provided swingably about the rear wheel axle 22 and rotatably supports the second sprocket 40 at its upper end portion.

A first spring 82 is provided so as to bias the second sprocket support bar 80 in the backward direction of the bicycle 10.

A tension-applying bracket 92 is rotatably provided on the second sprocket support bar 80.

An abutting roller 88 and a tension-applying spring 90 are rotatably provided at opposite ends of the tension-applying bracket 92, respectively.

In order to prevent soiling of the rider's clothes due to the lubricant oil adhered to the chain 42, a cover (not shown) which covers the entirety of the chain 42 wound between the first sprocket 38 and the second sprocket 40 and transmitting the rotation force therebetween, may be preferably provided.

A first rachet 44 which restricts the rotation of the rear wheel 14 in the backward direction of the bicycle 10 via the large gear 24 is provided on the small gear 26.

As described below, by disengaging the first rachet 44 from the small gear 26, the driving force can be transmitted to the rear wheel 14 simply by the rider pedaling the pedal 20. However, by engaging the first rachet 44 with the small gear 26, a physical burden on the legs can be reduced by utilizing the downward load, in accordance with the longitudinal position of the load transmission unit 36 on the load receiving surface 32, in a case where the bicycle 10 is caused to climb uphill.

An operation lever 70 which extends downwardly is provided near the saddle 12.

An intermediate portion of the operation lever 70 is rotatably supported by the body frame 18. An extension member 72, a front end 71 of which is connected to a lower end portion 73 of the operation lever 70, is provided, whereby the slide bracket 48 can be adjustably positioned in the longitudinal direction by the longitudinal movement of the operation lever 70 with the first roller arrangement 66 and the second roller 68 being moved along the first groove 58 and the second groove 64 in a rolling manner, respectively.

A lock pin 74 which can be vertically moved is provided on the operation lever 70, while a group of lock grooves 76, each of which extends in the direction perpendicular to the longitudinal direction of the bicycle 10, are provided on the body frame 18.

An inclination angle of the operation lever 70 is set, depending on which groove among the group of the lock grooves 76 the lock pin 74 locks against.

The operation lever 70 is rotatably supported at a position 104 frontwardly of the rear wheel axle 22 of the longitudinal lower frame portion 78. A vertically extending slit 98 is provided on the lower end 73 of the operation lever 70, and the front end of the extension member 72 is vertically movable in the slit 98.

A first rotation restriction member 84 extends toward the second sprocket support bar 80 at a position rearwardly of a position where the longitudinal lower frame portion 78 supports the rear wheel axle 22.

A vertically extending second rotation restriction member 86 is provided at a position rearwardly of the position where the longitudinal lower frame portion 78 supports the rear wheel axle 22, and at a position frontwardly of the first rotation restriction member 84. The second rotation restriction member 86 restricts the rotation of the small gear support bracket 34 in the backward direction of the bicycle 10.

More specifically, with respect to the first rotation restriction member 84, as shown in FIG. 1, the second sprocket support bar 80 is biased toward the right side by the first spring 82, which spring 82 is attached to a horizontal part of the second sprocket support bar 80, about the rear wheel axle 22.

More specifically, the first rotation restriction member 84 is adapted to restrict further rotation of the second sprocket support bar 80 in the clockwise direction due to engagement of the upper end of the first rotation restriction member 84 with a side portion of the second sprocket support bar 80.

On the other hand, with respect to the second rotation restriction member 86, as shown in FIG. 1, in a case where the vertical bar 60 is caused to rotate in the clockwise direction about the support position of the rear wheel axle 22, the second rotation restriction member 86 restricts further rotation, in the clockwise direction, of the vertical bar 60 by the upper end of the second rotation restriction member 86 abutting against a side portion of the vertical bar 60.

This causes the first sprocket 38 to move toward the second sprocket 40, whereby the loosening of the chain 42 between the first and second sprockets 38, 40 is restricted.

The height of the upper end of each of the first and second rotation restriction members 84,86 may be appropriately set, and the longitudinal position of the upper end of each of the first and second rotation restriction members 84,86 may be appropriately set, in view of attaining the above functions.

A second rachet 94 which restricts backward rotation of the rear wheel 14 of the bicycle 10 is provided to cooperate with the large gear 24. More specifically, the second rachet 94 is provided on a rear end 95 of the longitudinal lower frame portion 78.

The angular range of the rotation of each of the small gear support bracket 34 and the L-shaped load transmission frame 46 is set to be between 1° and 2°.

By setting the above angular range, the slide bracket 48 can be longitudinally moved due to the rolling of the first roller 16 in the first groove 58, while at the same time, the second roller 68 rolls in the second groove 64, irrespective of the inclination of each of the small gear support bracket 34 and the L-shaped load transmission frame 46.

Alternatively, the span between the first sprocket 38 and the second sprocket 40 and/or the level of the first sprocket 38 may be preferably set, in accordance with the value of the downward load.

Alternatively, the spring constant of the first spring 82 may be preferably set in accordance with the maximum expected inclination angle when the bicycle 10 is caused to climb an uphill slope.

Further, and alternatively, the frontmost position of the slide bracket 48 in the longitudinal direction of the bicycle 10 may be preferably set in accordance with the maximum expected inclination angle when the bicycle 10 is caused to climb an uphill slope.

Further, and alternatively, the position of the saddle 12 or the distance between a support pin 102 and the saddle 12 may be preferably adjusted.

Further, and alternatively, the weight of a load platform at the rear side of the bicycle 10 may be preferably transmitted to the load transmission unit 36.

The operation of the bicycle 10 with the above structure will now be discussed, with reference to FIGS. 1 to 4.

(1) Driving on a Flat Road

For example, in a case where the bicycle 10 is driven on a flat road, the bicycle 10 can be moved forwardly and backwardly in a normal manner with the first rachet 44 and the second rachet 94 disengaged from the small gear 26 and the large gear 24, respectively.

More specifically, the operation lever 70 is pressed toward the frontmost position in the longitudinal direction of the bicycle 10, so that the slide bracket 48 is moved toward its closest position to the vertical bar 60 of the small gear support bracket 34.

As a result, the small gear support bracket 34 is moved so as to forwardly fall down until the second sprocket support bar 80 and the first rotation restriction member 84 restricts such a movement via the chain 42. The saddle 12 and the rear wheel axle 22 are set free due to the fact that the first rachet 44 is disengaged from the small gear 26, the weight of the saddle 12 is transmitted via the slide bracket 48 to the small gear support bracket 34, and thus to the rear wheel axle 22, which is the normal operational situation of a conventional bicycle.

The small gear 26 is positioned at the upper vertical level relative to the ground surface by the small gear support bracket 34, while the slide bracket 48 is positioned closest to the vertical bar 60 in the vertical bar 62 of the small support bracket 34, under the no load condition.

The weight of the rider is transmitted to the L-shaped load transmission frame 46 via the saddle 12, and the L-shaped load transmission frame 46 is downwardly moved about the frame pin 102 so that the slide bracket 48 is also downwardly moved, since the slide bracket 48, which is slidable (via the second roller 68) in the second groove 64 provided on the lower end surface of the L-shaped load transmission frame 46, is provided so as to be vertically movable in the slit 98 provided on the lower portion of the operation lever 70.

The small gear support bracket 34 is rotated about the rear wheel axle 22 by the downward movement of the slide bracket 48, while at the same time, the vertical bar 60 is rotated in the left direction by the downward movement of the longitudinal bar 62, whereby the balancing of the small gear 26 is started with being rotatably supported on the end portion of the small gear support bracket 34.

The small gear 26 is prevented from rotating in the counter-clockwise direction by the first rachet 44, and is caused to move in a reciprocating manner within a gap between the second rotation restriction member 86 and the small gear support bracket 34, and is finally held at a stable position.

(2) Climbing an Uphill Slope

The operation lever 70 is adjusted to a desired angular position by being moved backwardly, in accordance with the inclination angle of the uphill slope, so as to fit the lock pin 74 at the desired position in the selected groove of the group of lock grooves 76.

This causes the slide bracket 48 to slide from the rearmost position of the bicycle 10 to the predetermined front position, with the first roller arrangement 66 and the second roller 68 rolling in the first groove 58 and the second groove 64, respectively.

In accordance with the ratio of the distance between the center of the rear wheel axle 22 and the load applied point to the distance between the center of the rear wheel axle 22 and the center of the small gear 26, load derived from the weight of the rider is exerted on the small gear 26 on the small gear support bracket 34, based on the principle of leverage.

The rear wheel 14 is prevented from backwardly rotating by the second rachet 94, while the second sprocket 40 is caused to rotate in the direction in which the bicycle is downwardly moved by the fact that the second sprocket support bar 80 is biased downwardly by the first spring 82 so as to move the second sprocket 40 downwardly, while at the same time, the weight of the second sprocket 40 works. Such a rotation force is transmitted to the small gear 26 via the chain 42.

In this connection, the downward movement of the second sprocket 40 is limited to a certain range by the second rotation restriction member 86.

The small gear 26 is caused to rotate about the support portion of the rotation of the small gear support bracket 34 at a position where the small gear 26 is kept balanced, so that the rear wheel 14, mating with the small gear 26, is caused to rotate in the direction in which the bicycle 10 climbs the uphill slope. This causes the climbing operation by pedaling to be alleviated.

In such a case, the tension applying bracket 92, which includes at its one end the tension applying spring 90 and at its other end the abutting roller 88, is biased toward the second sprocket support bar 80, so that the rotation force of the second sprocket 40 is transmitted to the small gear 26 via the chain 42, without causing loosening of the chain 42, by the abutting roller 88 applying tension to the chain 42.

When the rider gets off of the bicycle 10, the weight of the rider is removed, so that the small gear support bracket 34 is moved to the right about the rear wheel axle 22, and as a result, the small gear 26 moves toward the second sprocket 40, whereby the chain 42 is loosened. The second rotation restriction member 86 is provided in order to limit the movement of the small gear 26 to within a certain range.

Figure 2:
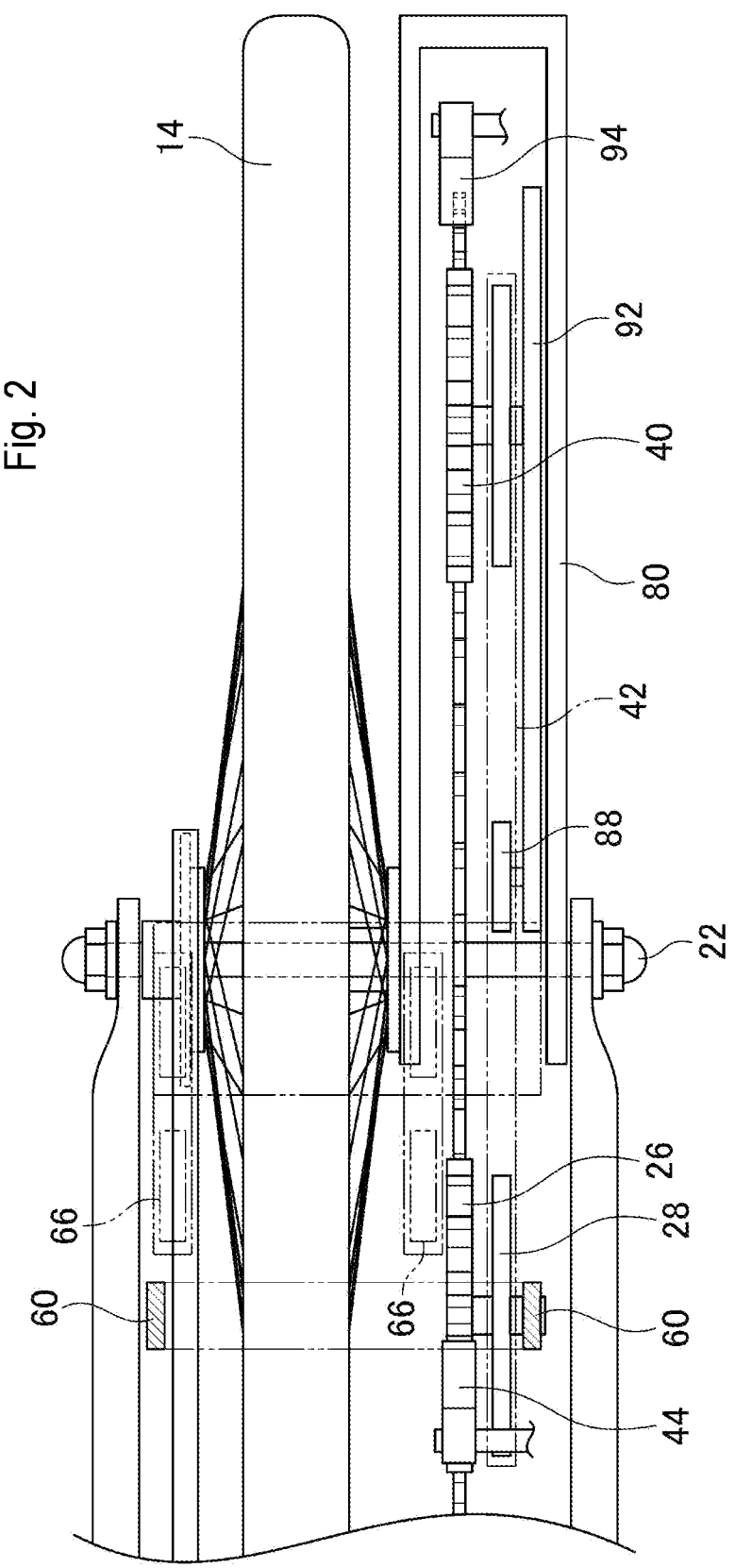
FIG. 2 is a partial plan view illustrating the bicycle according to the embodiment of the present invention.
Figure 3:
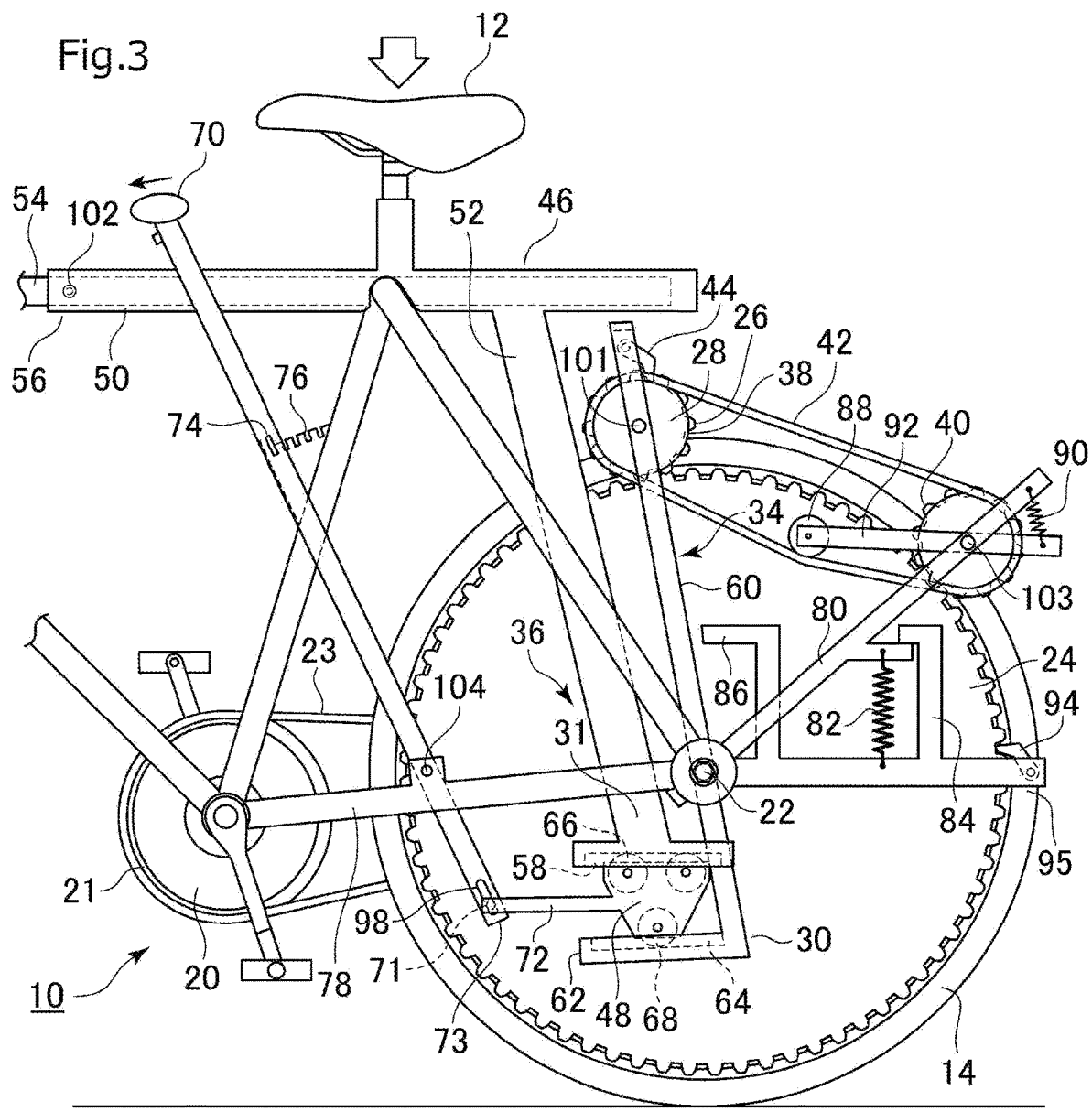
FIG. 3 is a partial view illustrating the bicycle according to the embodiment of the present invention in a case where the bicycle is run on a flat road.
Figure 4:
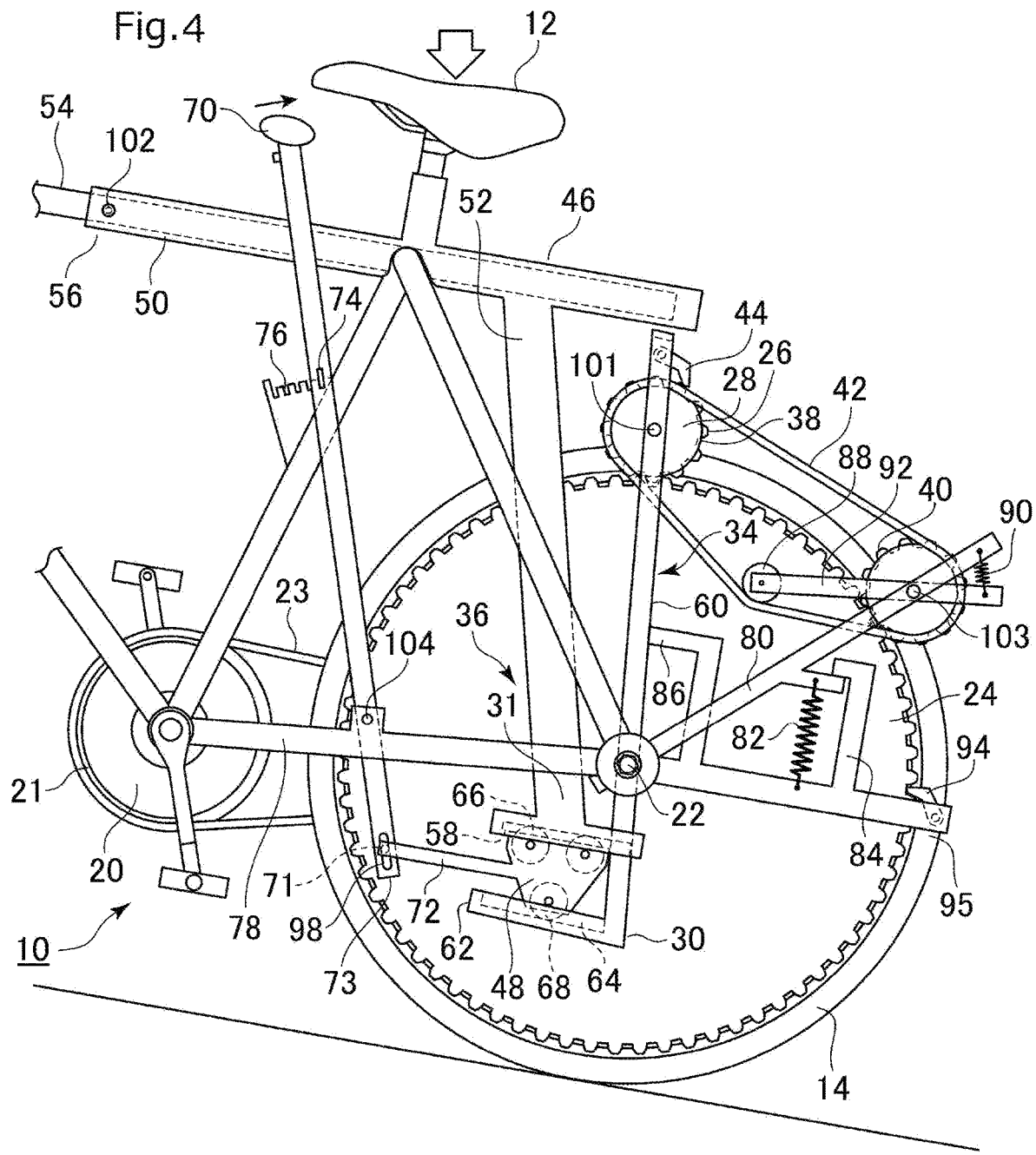
FIG. 4 is a partial view illustrating the bicycle according to the embodiment of the present invention in a case where the bicycle climbs an uphill slope.

As clearly shown in FIGS. 1 to 3, when the rider sits on the saddle 12, the vertical portion 52 moves downwardly, and such a downward movement is transmitted to the lower end portion 30 of the small gear support bracket 34 via the second roller 68. When the lower end portion 30 is pressed downwardly, the upper end portion 28 of the small gear support bracket 34 is moved in a seesaw operation in the direction corresponding to the forward movement direction of the bicycle 10 (left direction in FIG. 3) about the rear wheel axle 22.

Since the first rachet 44 restricts the rotation of the rear wheel 14 in the rearward movement direction of the bicycle 10, the rotation of the small gear 26 in the counter-clockwise direction (FIG. 3) is restricted. As a result, the large gear 24 mating with the small gear 26 is pressed in the forward movement direction of the bicycle by the upper end portion 28 of the small gear support bracket 34, with the rotation of the small gear 26 in the counter-clockwise direction being restricted, so that the rear wheel 14 is caused to rotate in the forward movement direction of the bicycle 10.

In short, the small gear 26 is caused to move downwardly and in the left direction (FIG. 3) along the outer periphery of the large gear 24 without slipping relative to the large gear 24, with the teeth of the small gear 26 being mated with the teeth of the large gear 24, and the large gear 24 is caused to move in the left direction, In other words, the rear wheel 14 is caused to rotate in the forward movement direction of the bicycle 10.

Accordingly, in a case where the bicycle 10 climbs an uphill slope, by engaging the first rachet 44 with the small gear 26 to restrict the rear wheel 14 from rotating in the rearward movement direction of the bicycle 10, a burden on the legs of the rider can be reduced by the downward load being utilized, in accordance with the position of the load receiving surface 32 of the load transmitting unit 36 in the longitudinal direction of the bicycle 10.

In the bicycle with the above structure, based on the technical relationship between the large gear 24 with the diameter smaller than that of the rear wheel 14, which large gear 24 is provided concentrically with the rear wheel 14 about the rear wheel axle 22 so as to be rotated integrally with the rear wheel 14, and the small gear 26 which is provided so as to circumscribe the large gear 24 at a level higher than the rear wheel axle 22, the rider's own weight is transmitted to the rear wheel 14 via the saddle 12, the load transmission unit 36, the load receiving surface 32 of the load transmission unit 36, the small gear support bracket 34, the small gear 26, and the large gear 24 mating with the small gear 26.

Due to the first sprocket 38, which can rotate concentrically with the small gear 26, the second sprocket 40, the center of rotation of which is set lower than that of the first sprocket 38, and the chain 42 which transmits the rotation force between the first and second sprockets, in a case where the bicycle 10 climbs an uphill slope, the physical burden on the legs can be reduced by utilizing the downward load, in accordance with the longitudinally adjusted position of the load receiving surface 32 of the load transmission unit 36.

The embodiment of the present invention has been described in detail above. A person skilled in the art may make various modifications and changes insofar as they are not out of the scope of the present invention.

For example, it is described herein that the small gear 26 circumscribes the large gear 24. However, the present invention clearly encompasses a case where the small gear 26 inscribes the large gear 24.

Further, it is described herein that the small gear 26 is located at the highest level of the large gear 24. However, the present invention clearly encompasses a case where the small gear 26 is located above the rear wheel axle 22.

The invention claimed is:

1. A bicycle comprising:
   a saddle;
   front and rear wheels;
   a body frame which fixedly supports said saddle and rotatably supports said rear and front wheels to transmit a driving force to said front wheel by pedaling a pedal by foot;
   a large gear which can be rotated integrally with said rear wheel and is provided concentrically with said rear wheel about a rear wheel axle, and includes a diameter smaller than that of said rear wheel;
   a small gear which is provided so as to circumscribe said large gear at a level above the rear wheel axle;
   a small gear support bracket which is provided so as to swing about said rear wheel axle, and rotatably supports said small gear at its upper end, and includes a load receiving surface at its lower end;
   a load transmission unit which is downwardly movably supported on said body frame and downwardly movable by a downward load and adjustably movable in a longitudinal direction of the bicycle on said load receiving surface;
   a first sprocket which is provided concentrically with said small gear so as to be rotatable integrally with said small gear;
   a second sprocket which is rotatably provided rearwardly of said first sprocket and at a level lower than a rotation center of said first sprocket;
   a chain which is wound between said first and second sprockets to transmit a rotation force between said first and second sprockets; and
   a first rachet which is mounted on said small gear so as to restrict rearward rotation of said rear wheel via said large gear, whereby a driving force can be transmitted to said rear wheel only by pedaling said pedal with said first rachet being disengaged from said small gear, while a physical burden on the legs of a rider can be reduced by engaging said first rachet with said small gear to utilize the downward load, in accordance with a longitudinal position of said load transmission unit relative to said load receiving surface, in a case where the bicycle climbs an uphill slope.

2. The bicycle according to claim 1, wherein said load transmission unit includes an L-shaped load transmission frame which is vertically swingably supported by said body frame, and a slide bracket which is interposed between said L-shaped load transmission frame and said small gear support bracket, said L-shaped load transmission frame includes a horizontal part and a vertical part, a front end of said horizontal part is pivotably supported by a longitudinal upper frame portion of said body frame which said saddle is fixed to and which extends in the longitudinal direction of the bicycle, said vertical part is vertically swingable and abuts against an upper end of said small gear support bracket, said vertical part includes at a lower end portion thereof a first groove which extends in the longitudinal direction of the bicycle, said small gear support bracket is L-shaped and includes a vertical bar and a longitudinal bar extending in the longitudinal direction of the bicycle from a lower end of the vertical bar, said small gear is rotatably supported at an upper end portion of said vertical bar, a second groove extending in the longitudinal direction of the bicycle is provided on an upper surface of said longitudinal bar, said slide bracket includes a first roller which can roll in said first groove and a second roller which can roll in said second groove.

3. The bicycle according to claim 2, wherein a downwardly extending operation lever is provided near said saddle and is rotatably supported at its intermediate portion by said body frame, and an extension member, a front end of which is connected to the lower end portion of said operation lever, is provided, whereby a longitudinal position of said slide bracket can be adjusted by movement of the operation lever, with said first and second rollers rolling in n said first and second grooves, respectively.

4. The bicycle according to claim 3, wherein a pair of said first rollers which are spaced apart from each other in the longitudinal direction are provided, and said second roller is a single roller.

5. The bicycle according to claim 3, wherein a lock pin which is vertically movable is provided on said operation lever, a group of lock grooves, each of which extend in a direction perpendicular to the longitudinal direction of the bicycle, are provided on said body frame, whereby an inclination angle of said operation lever can be set, depending on which lock groove among said group of lock grooves said lock pin is locked against.

6. The bicycle according to claim 5, wherein said body frame includes a longitudinal lower frame portion to a front end of which a front sprocket is connected to a rear sprocket via a chain and rotatable by said pedal, is rotatably supported, and to a rear end of which a rotation axis of said rear wheel is rotatable integrally with said rear sprocket, is rotatably supported, said bicycle further comprising a second sprocket support bar which is provided so as to be swingable about said rotation axis of said rear wheel and rotatably supports said second sprocket at its upper end portion, a first spring which biases said second sprocket support bar in a backward direction of the bicycle, and a first rotation restriction member extending toward said second sprocket support bar at a position rearwardly of where said longitudinal lower frame portion supports of said rear wheel.

7. The bicycle according to claim 6 further comprising an upwardly extending second rotation restriction member disposed rearwardly of the position where said longitudinal lower frame portion supports said rear wheel to restrict rotation of said small gear support bracket in the backward direction of the bicycle.

8. The bicycle according to claim 6, wherein said operation lever is rotatably supported at a position frontwardly of where said longitudinal lower frame portion supports said rear wheel.

9. The bicycle according to claim 6, further comprising a tension applying bracket, on one end of which a roller is provided and on the other end of which a spring is mounted, the tension applying bracket being rotatably provided on said second sprocket support bar.

10. The bicycle according to claim 6, further comprising a second rachet which restricts a rotation of said rear wheel in the backward direction of the bicycle and cooperates with said large gear, said second ratchet being provided on a rear end of said longitudinal lower frame portion.

11. The bicycle according to claim 6, wherein a space between said first sprocket and said second sprocket and/or a level at which said first sprocket is provided are set, in accordance with said downward load.

12. The bicycle according to claim 6, wherein a spring constant of said first spring is set, in accordance with a maximum expected inclination angle, in a case where the bicycle is caused to climb an uphill slope.

13. The bicycle according to claim 6, wherein a frontmost position of said slide bracket is set, in accordance with a maximum expected inclination angle, in a case where the bicycle is caused to climb an uphill slope.

14. The bicycle according to claim 3, wherein a vertically extending slit is provided on a lower end portion of said operation lever and the front end of said extension member is vertically movable via the slit.

15. The bicycle according to claim 2, wherein a pair of said small gear support brackets and a pair of said L-shaped load transmission frames are provided in such a way that one of said small gear support brackets is mounted on one side of said bicycle along with one of said L-shaped load transmission frames, and the other of said small gear support brackets is mounted on an opposite side of said bicycle along with the other of said L-shaped load transmission frames.

16. The bicycle according to claim 1, wherein said small gear is provided at a highest level of said large gear.

17. The bicycle according to claim 1, further comprising a loading platform on a rear portion of said bicycle such that its weight is transmitted to said load transmission unit.

18. The bicycle according to claim 1, wherein an angular range of rotation of each of said small gear support bracket and said L-shaped load transmission frame is set to be between 1° and 2°.

* * * * *